United States Patent

Wieres

[11] Patent Number: 6,145,195
[45] Date of Patent: Nov. 14, 2000

[54] PROCESS FOR THE PRODUCTION OF A HONEYCOMB BODY OF TWISTED SHEET METAL LAYERS

[75] Inventor: Ludwig Wieres, Overath, Germany

[73] Assignee: Emitec Gesellschaft fuer Emissionstechnologie GmbH, Lohmar, Germany

[21] Appl. No.: 09/082,204

[22] Filed: May 20, 1998

[30] Foreign Application Priority Data

May 20, 1997 [DE] Germany .......................... 197 21 077

[51] Int. Cl.⁷ .................................................. B21D 51/16
[52] U.S. Cl. ............................. 29/890; 29/505; 422/180; 502/527.19; 502/527.22
[58] Field of Search .................................. 29/446, 469.5, 29/890, 505; 422/177, 180; 502/439, 527.19, 527.2, 527.21, 527.22

[56] References Cited

U.S. PATENT DOCUMENTS

| | | | |
|---|---|---|---|
| 4,300,956 | 11/1981 | Rosenberger et al. | 148/6.3 |
| 4,923,109 | 5/1990 | Cyron | 228/181 |
| 4,969,265 | 11/1990 | Ehara | 29/890 |
| 5,055,274 | 10/1991 | Abbott | 422/171 |
| 5,133,944 | 7/1992 | Knetsch et al. | 422/180 |
| 5,329,698 | 7/1994 | Abbott | 29/890 |
| 5,608,968 | 3/1997 | Maus et al. | 29/890 |
| 5,785,931 | 7/1998 | Maus et al. | 422/180 |

OTHER PUBLICATIONS

Japanese Patent Abstract No. 01304050 (Kazuichi), dated Dec. 7, 1989.

*Primary Examiner*—David P. Bryant
*Assistant Examiner*—Essama Omgba
*Attorney, Agent, or Firm*—Herbert L. Lerner; Laurence A. Greenberg; Werner H. Stemer

[57] ABSTRACT

A honeycomb body has a plurality of at least partially structured sheet metal layers forming a plurality of passages through which a fluid can pass. The sheet metal is plastically deformed in a region of a mandrel passage whose cross-section is substantially determined by a mandrel of a winding device with which the honeycomb is formed. The free flow cross-section of the mandrel passage is closed at least in a portion of the passage along the flow direction by deforming the sheet metal with a deformation punch. The deformation punch has an end portion with a sharp-edged rim.

5 Claims, 3 Drawing Sheets

PROCESS FOR THE PRODUCTION OF A HONEYCOMB BODY OF TWISTED SHEET METAL LAYERS

BACKGROUND OF THE INVENTION

Field of the Invention

The present invention relates to a process, a device and an apparatus for the production of a honeycomb body having a plurality of at least partially structured metal sheets which form a plurality of passages through which a fluid can pass.

Catalytic converters are used for reducing the emission of pollutants from internal combustion engine, in particular Otto engines. The catalytic converter has a catalytically active substance which disposed on a carrier. In order to provide the largest possible surface area for the catalytically active substance, the carrier body may have a honeycomb form. Such a honeycomb body is formed from one or more stacks of a plurality of at least partially structured sheets. U.S. Pat. No. 4,923,109 discloses a design configuration of a honeycomb body in which the stack is twisted or wound in opposite directions about itself and about a central region.

International publication WO 90/03220 describes a metallic catalyst carrier body. That carrier body is made up from at least partially structured sheets. It includes three or more stacks of sheets which are folded about a bend line in the central region of the honeycomb body and twisted in opposite directions around each other and around the central region with the bend lines.

Further catalyst carrier body configurations are disclosed, for instance, in international publication WO 94/01661.

Catalyst carrier bodies of that kind are produced with apparatuses that include a forked winding or wrapping device which rotates about a central axis and which engages each stack. A shaping mold or matrix has an internal contour which substantially corresponds to the external contour of the honeycomb body in the wound condition.

German published, non-prosecuted application DE 195 22 327 A1 discloses an apparatus for the production of a honeycomb body that has a plurality of at least partially structured sheets forming a plurality of passages through which a fluid can pass. The apparatus includes a forked wrapping or winding device which is rotatable about a central axis and which engages each stack, and a shaping mold or matrix which is of an internal contour corresponding to the external contour of the honeycomb body to be produced. The mold or matrix surrounds the winding device. The wall of the mold is formed with at least one opening for the stack ends. The opening extends substantially parallel to the central axis. During the production of a honeycomb body, at least one stack which is formed by a multiplicity of at least partially structured sheets is introduced into the mold, with the ends of each stack projecting out of the mold through openings. Each stack is held in a central region by a winding device which is rotatable about a central axis. As the winding device rotates, the stacks are twisted to form a honeycomb body which fills the entire mold.

German published, non-prosecuted application DE 195 21 685 A1 also discloses an apparatus and a process for the production of a honeycomb body. The apparatus includes a forked winding device which is rotatable about an axis and which engages each stack, and mold segments which close to define a mold. The mold is formed from at least two mold segments. Each mold segment is pivotable about a pivot axis which respectively extends parallel to the axis of the winding device, opposite to the direction of rotation of the winding device. The mold segments are closed in opposite relationship to the direction of rotation of the winding device when the stack has reached a predetermined degree of winding.

The wound honeycomb bodies are conventionally introduced into tubular casings. The honeycomb bodies are introduced into a tubular casing substantially immediately following the winding operation. In that procedure, the honeycomb body is pressed into the tubular casing in the axial direction thereof.

The carrier body which is produced in that way is subjected to further production steps which involve for example brazing, sintering or welding. The metal honeycomb bodies are integrated into an exhaust system. For that purpose the two ends of the carrier body are connected to a respective pipe of the exhaust system. To provide for a satisfactory connection between the tubular casing of the carrier body and the component parts of the exhaust system, it is necessary for the dimensions of the tubular casing and the contour thereof to be within certain tolerances. In order to observe the required tolerances, the art calibrates the tubular casing of the carrier body prior to and/or after the insertion of the honeycomb body. The calibration is generally effected in such a way that a tool with a plurality of segments is introduced into the tubular casing and the individual segments are spread radially outwardly. The segments are spread beyond the yield limit of the casing material so that the tubular casing is stress-free in that region. International application WO 96/14500 discloses an apparatus with which it is possible to calibrate a honeycomb body with a tubular casing.

Moreover, international application WO 96/12876 discloses a catalyst carrier body in which the free flow cross-section of the passages is closed in an outer annular region, at least in a portion of the exhaust gas flow. The passages are closed by plastic deformation of the passage walls. The closed passages serve to provide for heat insulation.

The winding device with at least one holding mandrel or bar forms a channel in the honeycomb body (e.g. the catalyst carrier body) whose cross-section is substantially determined by the cross-section of the mandrel. When a winding device with a plurality of mandrels is used, there result a corresponding number of such passages within the honeycomb body. The free cross-section of the mandrel passage is usually larger than the cross-section of the other passages in the honeycomb body. The flow profile is affected by the presence of at least one mandrel passage. If the honeycomb body has a plurality of mandrel passages, they have a greater influence on the catalytic effect of the honeycomb body used as a catalyst carrier body.

SUMMARY OF THE INVENTION

It is accordingly an object of the invention to provide a process for the production of a honeycomb body which overcomes the above-mentioned disadvantages of the prior art methods of this general type and which reduces the impact of the mandrel passages on the operating behavior of a honeycomb body. It is a further object of the invention to provide a honeycomb body, and a device and an apparatus by means of which the impact of the one or more mandrel passage on the operating performance of the honeycomb body is reduced, utilizing simple measures.

With the foregoing and other objects in view there is provided, in accordance with the invention, a method of producing a honeycomb body, which comprises:

providing a winding device with a mandrel;

winding a plurality of at least partially structured sheet metal layers with the winding device to form a honeycomb body defining a plurality of passages through which a fluid can flow along a flow direction, and forming a mandrel passage in the honeycomb body with the mandrel of the winding device; and closing a free cross-section of the mandrel passage at least in a portion along the flow direction of the fluid.

The starting point of the invention is essentially a honeycomb body with a plurality of at least partially structured sheets or sheet metal layers forming a plurality of passages through which a fluid can flow. At least one passage is a mandrel passage whose cross-section is essentially determined by a mandrel or bar of the winding device. Such a honeycomb body may be produced, for example, by the honeycomb body production process known from the German published applications DE 195 21 685 A1, DE 195 22 327 A1 or DE 195 28 963 A1. These disclosures are herewith expressly incorporated by reference.

The process according to the invention is characterized in the plastic deformation of at least a part of the sheets in the region of the mandrel passage whose cross-section is determined substantially transversely by the mandrel of the winding device. The free flow cross-section of the mandrel passage is thereby closed at least in a portion thereof relative to the direction of flow of the fluid (e.g. the exhaust gas). The process may result in a complete closure of the mandrel passages whereby the mandrel passages have no influence or a partial closure whereby they have only a very slight influence on the operating performance of the honeycomb body.

The novel method is preferably integrated in conventional honeycomb body production methods. For that purpose, in accordance with an added feature of the invention, the sheets are plastically deformed in the region of the mandrel passage prior to the removal of the honeycomb body from a shaping mold. The mold serves to form a honeycomb body, wherein at least one layered stack comprising a plurality of at least partially structured sheets is introduced into the mold for forming a honeycomb body and is held and wound around in the mold by a winding device in a central region. The advantage of this embodiment of the process is that the plastic deformation operation follows immediately after the honeycomb body is formed in the mold. This alternative form of the process can be integrated within a honeycomb body production procedure.

In accordance with an additional feature of the invention, the plastic deformation is effected during the removal of the honeycomb body from the mold. With such a procedure, two process steps, namely the removal of the honeycomb body from the mold and producing the plastic deformation, are integrated to constitute a joint step in the process. By virtue of that integration of the plastic deformation operation within the removal of the honeycomb body from the mold, no additional time is required for effecting plastic deformation as that operation is implemented in situ with the step of removing the honeycomb body from the mold.

Effecting plastic deformation of at least a part of the sheets in the region of a mandrel passage prior to the removal of the honeycomb body from the mold or during the removal of the honeycomb body from the mold also has the advantage that the honeycomb body can adopt a position which is defined in relation to the mandrel passages, in respect of a bar punch or ram which is used for producing the plastic deformation of at least a part of the sheets. There is no need for the honeycomb body to be positioned for implementing plastic deformation.

Although it is necessary under some circumstances to position a honeycomb body which is introduced into a tubular casing in order to be able to effect plastic deformation of at least a part of the sheets in the region of the mandrel passage, it may be desirable to effect the deformation on the honeycomb body in a tubular casing. A honeycomb body which is introduced into a tubular casing and which was possibly subjected to a brazing operation has substantially reached its final position in the tubular casing. After the honeycomb body has been introduced into the tubular casing, the honeycomb body is relieved of stress so that the free cross-section of the mandrel passage can be larger than the cross-section of the mandrel passage in a honeycomb body which is still disposed in a shaping mold. Therefore, with both alternative forms of the process, care is to be taken to ensure that the plastic deformation is sufficiently great so that the cross-section of the mandrel passage is closed.

Preferably the deformation operation is effected during the introduction of the honeycomb body into a tubular casing. This means that two production steps are combined into one step in the process, whereby the time required for production of the honeycomb body is not increased.

With the above and other objects in view there is also provided, in accordance with the invention, a honeycomb body, comprising:

a plurality of at least partially structured sheet metal layers forming a plurality of passages through which a fluid can flow in a flow direction;

at least one of said passages being a mandrel passage having a cross-section determined by a mandrel of a winding device;

a free flow cross-section of said mandrel passage being closed in a portion along the flow direction by plastic deformation of said sheet metal layers in a region of said mandrel passage.

The cross-section of the mandrel passage prior to deformation is essentially determined by the mandrel or bar of the winding device. The free flow cross-section of the mandrel passage is closed at least in a portion along the flow direction of an exhaust gas by plastic deformation of at least a part of the sheets in the region of the mandrel passage. The sheets of the honeycomb body themselves form the closure for the mandrel passage so that it is possible to omit additional closure means. This configuration of the honeycomb body also provides that the cross-section of the mandrel passage no longer has a formative influence on the operating performance of the honeycomb body.

With the above and other objects in view there is also provided, in accordance with the invention, a device for closing a free cross-section of a mandrel passage formed in a honeycomb body, the honeycomb body having a plurality of at least partially structured sheet metal layers defining a multiplicity of flow passages through which a fluid can flow along a flow direction and the mandrel passage being formed by a mandrel of a winding device forming the honeycomb body, the device comprising:

a deformation punch for plastically deforming at least a part of the sheet metal layers in a region of the mandrel passage and closing a free flow cross-section of the mandrel passage at least in a portion thereof along the flow direction; and a counter-holding means opposite said deformation punch, said deformation punch and said counter-holding means being movable relative to each other.

A preferred embodiment of the device is one in which the deformation punch has a substantially V-shaped end portion.

With that punch the sheets are bent towards each other so that the mandrel passage is closed. Preferably the configuration of the deformation punch is such that it has a substantially hollow end portion, in particular the end portion has a hollow conical shape which enlarges towards a free end. In a most preferred embodiment it is a hollow cone.

The plastic deformation is further facilitated where the end portion of the deformation punch has a substantially sharp-edged rim. Upon the insertion of the deformation punch into the honeycomb body the rim cuts into the sheets and the cut-in portions are bent and possibly pressed together by the V-shaped configuration of the end portion. The fact that the punch cuts into the sheets facilitates the deformation procedure, while adjacent sheets are not influenced by the deformation or are so influenced only to a negligible extent.

In accordance with again another feature of the invention, there is provided an apparatus for the production of a honeycomb body as outline above, whereby the apparatus comprises the afore-mentioned device.

More specifically, the apparatus has a mold which has a preferably circumferentially extending outer flange which is releasably connected to a base plate formed with at least one passage opening extending substantially transversely with respect to the base plate, and a winding device. The deformation punch can be introduced into the mold through the passage opening so that deformation can be effected prior to removal of the honeycomb body from the mold. In that case, the deformation punch is introduced into the mold through the opening.

In accordance with again another feature of the invention, the apparatus has a mold with an ejector punch which can be passed through an opening in the base plate. The ejector punch also carries at least one deformation punch. That configuration of the apparatus provides that the deformation operation is effected during an operation for removal of the honeycomb body from the mold.

In accordance with a concomitant feature of the invention, the apparatus has a tubular casing punch by which a tubular casing can be pushed onto the honeycomb body. The tubular casing punch has at least one deformation punch. The mandrel passages are closed by the deformation punch while the tubular casing is slipped onto the honeycomb body.

Other features which are considered as characteristic for the invention are set forth in the appended claims.

Although the invention is illustrated and described herein as embodied in a process and apparatus for the production of a honeycomb body of twisted sheet metal layers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
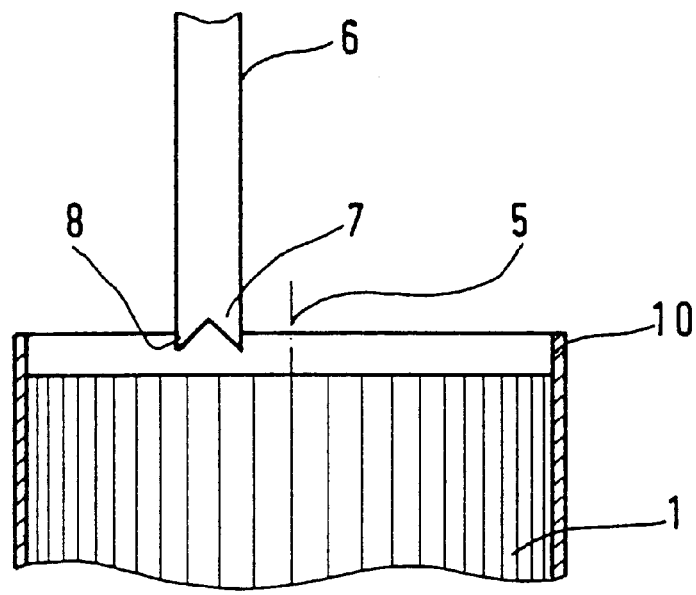
FIG. 1 is a diagrammatic sectional view of a honeycomb body with a tubular casing and a deformation punch.

Referring now to the figures of the drawing in detail and first, particularly, to FIG. 1 thereof, there is seen a metal honeycomb body 1 having a plurality of at least partially structured sheets forming a plurality of passages through which a fluid can pass. The honeycomb body 1 is disposed in a tubular casing 10. The cross-section of the honeycomb body is substantially circular. A deformation punch or ram 6 is located opposite an axial end face 5 of the honeycomb body. The deformation punch 6 can be reciprocated in the longitudinal (i.e. axial) direction. The displacement travel of the deformation punch 6 is such that it can engage into the honeycomb body 1 with its end portion 7 which is adjacent to the end face 5 of the honeycomb body 1.

Figure 3:
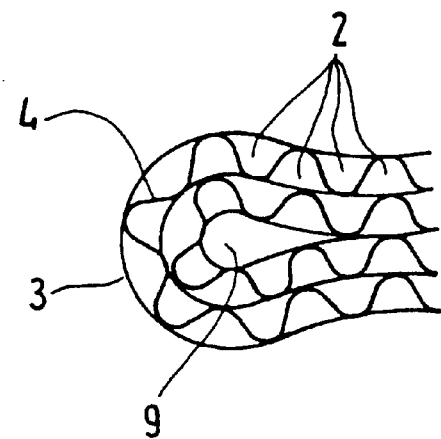
FIG. 3 is a partial diagrammatic elevational view of a honeycomb body.

The honeycomb body 1 is a monolithic structure formed of a plurality of at least partially structured metal sheets or sheet metal layers. As shown by the exemplary detail of FIG. 3, the honeycomb body 1 is formed from smooth sheets 3 and corrugated sheets 4. The smooth sheets 3 and the corrugated sheets 4 define a plurality of passages 2 through which a fluid can pass. It is apparent from the view in FIG. 3 that the honeycomb body has a mandrel passage 9. The mandrel passage 9 is defined by a smooth sheet 3. That is not necessarily the case. The free flow cross-section of the mandrel passage 9 is larger in comparison with the free cross-section of a passage 2.

Figure 2:
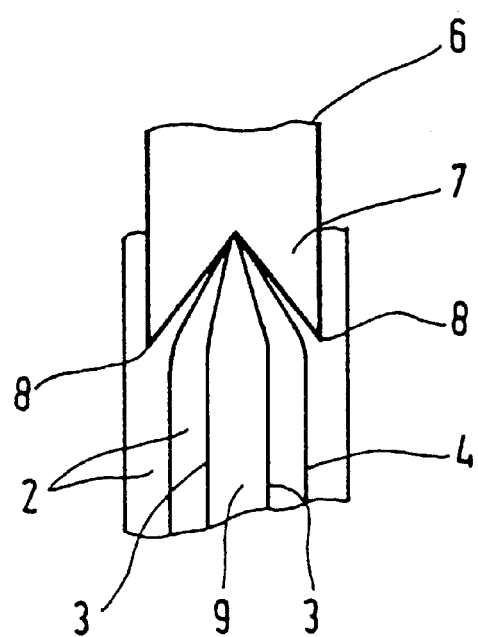
FIG. 2 is a partial diagrammatic snapshot view of a deformation punch which has penetrated into a honeycomb body.

The deformation punch 6 is partially driven into the honeycomb body 1 in order to close the mandrel passage 9. FIG. 2 shows a snapshot of the position of the deformation punch 6 within the honeycomb body 1. The deformation punch 6 has a substantially V-shaped end portion 7. As an alternative to the V-shaped configuration of the end portion 7 the deformation punch may also be a hollow taper which enlarges towards the free end. In particular the end portion has a hollow-conical configuration.

The end portion 7 has a substantially sharp-edged rim 8. When the deformation punch 6 penetrates into the honeycomb body 1 the sharp-edged rim 8 partially severs the sheets 3, 4. The sheets 3, 4 which are within an imaginary boundary line defined by the rim 8 are plastically deformed so that due to the plastic deformation they close the cross-section of the mandrel passage 9 (cf. FIG. 2).

Figure 4:
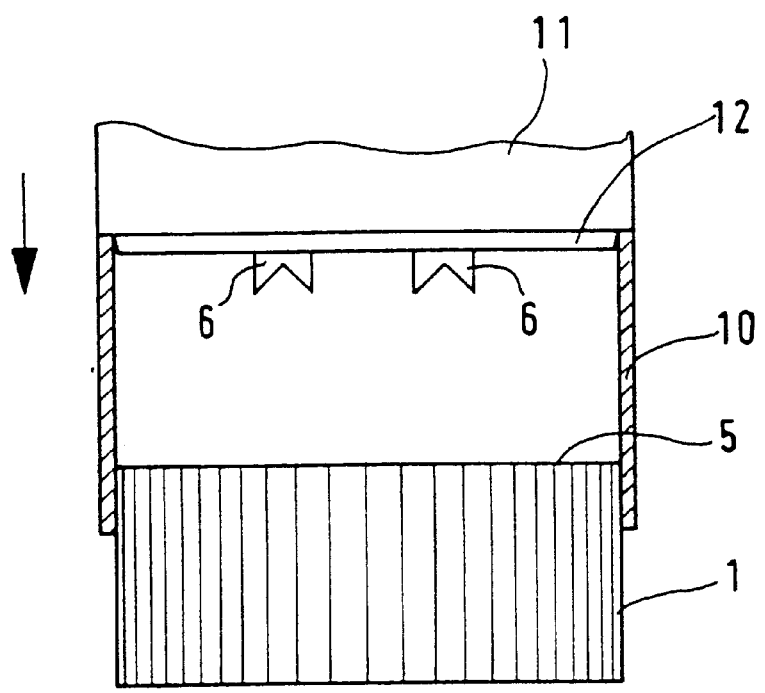
FIG. 4 is a partial sectional view of a honeycomb body with a tubular casing punch.

In the embodiment shown in FIG. 1, the honeycomb body 1 is already disposed in the tubular casing 10. The tubular casing 10 is pushed onto the honeycomb body 1 by means of a tubular casing punch or ram 11, as is shown in FIG. 4. Two deformation punches 6 are arranged at a spacing relative to each other at an end face 12 of the tubular casing punch 11. The end face 12 is thereby aligned adjacent the end face 5 of the honeycomb body 1. When the tubular casing 10 is pushed onto the honeycomb body 1 the mandrel passages of the honeycomb body 1 are closed by plastic deformation at least of a part of the sheets in the region of each mandrel passage. The free flow cross-section of the mandrel passage is thereby closed at least in a portion along the flow direction of an exhaust gas.

Instead of pushing the tubular casing onto the honeycomb body, the honeycomb body can be pushed into the tubular casing. In that case at least one deformation punch can be arranged on a non-illustrated punch member by which the honeycomb body is pushed into the tubular casing. Alternatively or in addition, at least one deformation punch can be arranged on a counter-holding means forming a support abutment for the tubular casing. The structure in principle of such an apparatus is substantially the same as the apparatus illustrated in FIG. 4, with the tubular casing punch 11 forming a stationary counter-holding means.

Figure 5:
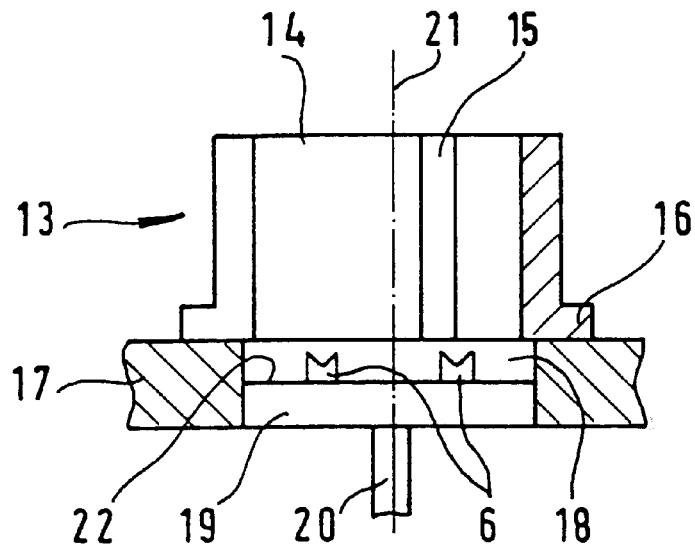
FIG. 5 is a sectional view of a first embodiment of an apparatus for the production of a honeycomb body.
Figure 6:
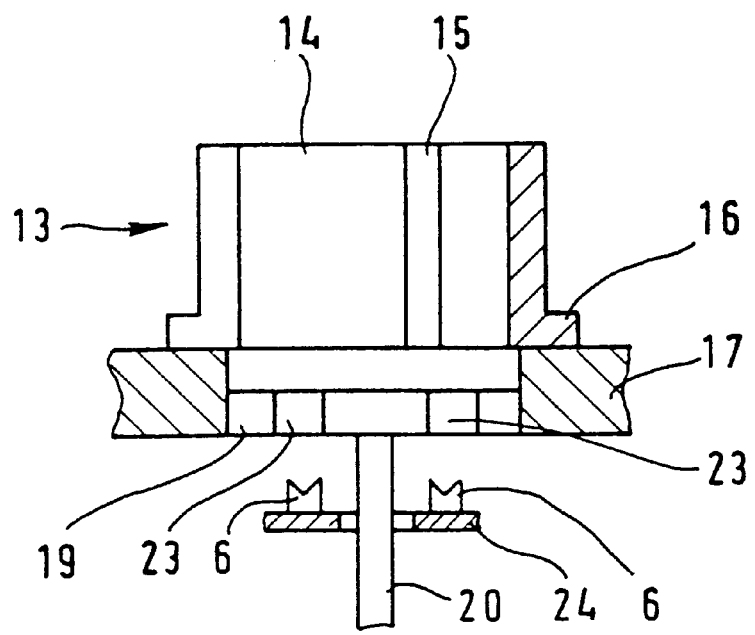
FIG. 6 is a sectional view of a second embodiment thereof.

FIGS. 5 and 6 each show a respective embodiment of an apparatus for the production of a honeycomb body. The configuration of the apparatuses substantially corresponds to the configuration of the apparatus known from German published application DE 195 22 327 A1. The content of that disclosure is incorporated herein. FIG. 5 shows a shaping mold or matrix 13 defined by a wall 14. The wall 14 has a plurality of openings 15 through which a stack of layered smooth and corrugated sheets can be introduced into the internal space of the mold 13. The wall 14 is connected by way of a flange 16 to a base plate 17. A winding device with bars which project into the interior of the mold 13 is not shown.

An opening 18 is formed in the base plate 17 through which an ejector punch 19 connected to an actuating rod 20 can be introduced into the interior of the mold 13. The punch 19 has deformation punches 6 at its end face 22 towards the interior of the mold 13. Actuation of the punch 19 in the direction of the longitudinal axis 21 of the mold 13 causes a honeycomb body which is disposed in the mold 13 to be urged out of the interior of the mold 13. During that operation the mandrel passages of the honeycomb body are simultaneously closed by the deformation punches.

FIG. 6 shows a further embodiment of an apparatus for the production of a honeycomb body. The structure in principle of the apparatus shown in FIG. 6 corresponds to that illustrated in FIG. 5. The same components of the apparatus are denoted by the same references. Unlike the apparatus shown in FIG. 5 the embodiment illustrated in FIG. 6 has an ejector punch 19 formed with passage openings 23 through each of which can be passed a respective deformation punch 6. The deformation punches 6 are disposed on a common carrier 24. The carrier 24 with the deformation punches 6 is mounted to be reciprocable in such a way that the deformation punches 6 can be guided through the passage openings 23 whereby the deformation punches 6 are partially introduced into a honeycomb body within the mold. The free flow cross-section at least of the mandrel passage is partly closed, i.e., along a portion in the direction of flow of the exhaust gas. After the mandrel passages have been closed the carrier can be returned to its starting position. The ejector punch 19 then conveys the honeycomb body out of the interior of the mold 13.

I claim:

1. A method of producing a honeycomb body, which comprises:

providing a winding device with a mandrel;

winding a plurality of at least partially structured sheet metal layers with the winding device to form a honeycomb body defining a plurality of passages through which a fluid can flow along a flow direction, and forming a mandrel passage having an opening in the honeycomb body with the mandrel of the winding device; and closing the opening of the mandrel passage by deforming the sheet metal layers in the region of the mandrel passage by applying a force along said flow direction.

2. The method according to claim 1, which further comprises introducing at least one layered stack of a plurality of metal sheets into a mold, holding the metal sheets with the winding device in a central region of the mold and winding the sheets, and wherein the closing step comprises deforming the metal sheets, and subsequently removing the honeycomb body from the mold.

3. The method according to claim 1, which further comprises introducing at least one layered stack of a plurality of metal sheets into a mold, holding the metal sheets with the winding device in a central region of the mold and winding the sheets, and wherein the closing step comprises deforming the metal sheets and simultaneously removing the honeycomb body from the mold.

4. The method according to claim 1, which comprises introducing the honeycomb body into a tubular casing and wherein the closing step comprises deforming the sheet metal after the introducing step.

5. The method according to claim 1, which comprises introducing the honeycomb body into a tubular casing and wherein the closing step comprises deforming the sheet metal simultaneously with the introducing step.

* * * * *